United States Patent
Delker et al.

(10) Patent No.: US 7,593,365 B1
(45) Date of Patent: Sep. 22, 2009

(54) METHOD AND SYSTEM FOR TRIGGERING EVENTS IN A WIRELESS NETWORK

(75) Inventors: Jason R. Delker, Olathe, KS (US); John M. Everson, Kansas City, MO (US); Lyle T. Bertz, Summit, MO (US)

(73) Assignee: Sprint Spectrum L.P., Overland Park, KS (US)

(*) Notice: Subject to any disclaimer, the term of this patent is extended or adjusted under 35 U.S.C. 154(b) by 709 days.

(21) Appl. No.: 10/980,711

(22) Filed: Nov. 3, 2004

(51) Int. Cl.
*G06F 15/16* (2006.01)
(52) U.S. Cl. ...................................... 370/328; 370/338
(58) Field of Classification Search ................ 370/331, 370/335, 337, 338, 328, 342; 455/436, 442
See application file for complete search history.

(56) References Cited

U.S. PATENT DOCUMENTS

| | | | | |
|---|---|---|---|---|
| 5,737,703 A | 4/1998 | Byrne | ........................ | 455/442 |
| 6,415,148 B1 | 7/2002 | Chiniga et al. | .............. | 455/434 |
| 6,438,117 B1 | 8/2002 | Grilli et al. | .................. | 370/331 |
| 6,680,923 B1 | 1/2004 | Leon | ........................... | 370/328 |
| 2001/0036830 A1* | 11/2001 | Wu et al. | ..................... | 455/436 |
| 2002/0034168 A1* | 3/2002 | Swartz et al. | ............... | 370/329 |
| 2002/0085516 A1 | 7/2002 | Bridgelall | ................... | 370/329 |
| 2003/0018015 A1 | 1/2003 | Anderson et al. | ............. | 514/81 |
| 2003/0091021 A1 | 5/2003 | Trossen et al. | .............. | 370/349 |
| 2003/0134636 A1* | 7/2003 | Sundar et al. | ............... | 455/432 |
| 2004/0076130 A1 | 4/2004 | Uchida et al. | ............... | 370/335 |
| 2004/0087309 A1 | 5/2004 | Joshi et al. | ................... | 455/450 |
| 2007/0201420 A1* | 8/2007 | Tejaswini et al. | ........... | 370/338 |

* cited by examiner

*Primary Examiner*—Sam Bhattacharya

(57) ABSTRACT

A wireless device may receive a first identifier from an access point for first wireless network that uses a first air interface protocol and a second identifier from an access point for a second wireless network that uses a second air interface protocol. The first and second identifiers may both be transmitted, for example, via the first air interface protocol. After receiving the identifiers, the wireless device may perform one or more predetermined actions. For example, the wireless device may, based on the identifiers, determine that it should communicate with the second wireless network and responsively check an availability of the second wireless network.

25 Claims, 8 Drawing Sheets

METHOD AND SYSTEM FOR TRIGGERING EVENTS IN A WIRELESS NETWORK

FIELD OF THE INVENTION

This invention relates generally to wireless networks. More specifically it relates to a method and system for triggering events in a wireless network.

BACKGROUND OF THE INVENTION

A wireless device may communicate with a first wireless network, such as a wireless local area network ("WLAN") that uses one of the various Institute of Electrical and Electronics Engineers ("IEEE") 802.11 protocols. The wireless device may communicate with other devices on the first wireless network. The first wireless network may additionally provide connectivity to one or more other networks, such as packet data networks, thereby allowing the wireless device to also communicate with devices on those other networks.

In addition to the first wireless network, the wireless device may also communicate with a second wireless network, such as a wireless wide area network ("WWAN"). The wireless device may connect to the second wireless network and then communicate with other devices on the second wireless network. The second wireless network may additionally provide connectivity to other networks, such as packet data networks. The wireless device may then also communicate with devices on those other networks.

The wireless device may communicate with one or both of the wireless networks, which can provide the wireless device with voice, data or other services. Although both wireless networks may provide the wireless device with one or more of these services, one wireless network may provide the wireless device with higher data speeds or lower access charges that make communicating with that network preferable. Therefore, even when the wireless device is communicating with one of the wireless networks, it might still be preferable for the wireless device to determine the availability of the other wireless network and then switch to communicating with that wireless network.

Further, the first and second wireless networks may have different coverage areas, thereby potentially creating areas where the wireless device might only be able to access one of the wireless networks. For example, as the wireless device changes location, it may leave the coverage area of one of the wireless networks and then only be in the coverage area of the other wireless network. If the wireless device were not already communicating with the other wireless network, it might be advantageous for the wireless device to detect that wireless network's availability and to begin communicating with that wireless network.

Current methods for detecting the availability of a wireless network have various limitations. In one method of detecting the availability of a wireless network, a user of the wireless device manually prompts the wireless device to check the availability of the wireless network, such as in response to a command from the user. This can disadvantageously create a delay in detecting the availability of the wireless network, because while the wireless device may be within range of the wireless network, the wireless device would only detect the wireless network if it receives the command from the user. A delay in making the request would cause a delay in detecting the wireless network's availability, and if the user did not even make a request, then the wireless device would not ever detect the wireless network's availability and may lose existing wireless network connectivity.

In another method of detecting the availability of the wireless network, the wireless device might automatically check for the wireless network's availability at predetermined time intervals. The wireless device might communicate with the wireless network using a radio or other transceiver, which the wireless device can power-up and then use to check the wireless network's availability. If the wireless network is not available, then the wireless device might power-down the radio until the next predetermined interval when it again check the wireless network's availability. Powering-up and powering-down the radio in this manner consumes battery power, which can be undesirable for battery-powered wireless devices. Similarly, continually leaving the radio on rather than periodically turning it on and off also consumes battery power and therefore may be undesirable.

Therefore, there exists a need for other methods for triggering a wireless device to perform predetermined actions, such as checking the availability of a wireless network.

SUMMARY OF THE INVENTION

In one embodiment, access points for a first wireless network, such as a WLAN, may broadcast an identifier associated with the first wireless network. Access points for a second wireless network, such as a WWAN, may broadcast an identifier associated with the second wireless network. While the first and second wireless networks use first and second air interface protocols, respectively, to provide access to the first and second wireless networks, the access points for both wireless networks broadcast their respective identifiers using the second air interface protocol.

A wireless device within range of access points for both the first and second wireless networks can receive the respective identifiers for the two wireless networks. In one embodiment, the first wireless network is a WLAN that uses the IEEE 802.11 air interface protocol, and the second wireless network is a WWAN that uses the CDMA air interface protocol. The wireless device would then be able to receive both respective identifiers for the first and second wireless networks via a CDMA air interface, and therefore the wireless device might only need to use a single CDMA radio in the wireless device in order to receive the identifiers from the two different types of wireless networks.

In one exemplary embodiment, the identifiers can be used to trigger the wireless device to perform one or more predetermined actions. For example, the wireless device may store a preferred roaming list or other information that allows the wireless device to use the identifiers it receives to select among the corresponding wireless networks in order to determine one of the wireless networks that the wireless device should preferably access for voice and/or data services. As the identifiers may be allocated among different types of wireless networks, the wireless device may also use the preferred roaming list or other information to determine an air interface protocol associated with the preferred wireless network.

In one embodiment, the wireless device determines that it should communicate with a wireless network that uses a different air interface protocol than is used to send and receive the identifiers. For example, the identifiers may be broadcast using the CDMA air interface protocol, and the wireless device may determine that it should preferably access an 802.11 wireless network. Thus, in one exemplary usage, the wireless device can use the identifiers to detect the availability of a wireless network that uses a different air interface protocol than is used to send and receive the identifiers.

The wireless device may responsively power-up an 802.11 radio in the wireless device and establish a connection with the 802.11 wireless network. The wireless device may additionally handoff an existing voice or data session, for example from a CDMA wireless network, to the 802.11 wireless network. The wireless device might also terminate an existing connection with a CDMA wireless network and then power-down a CDMA radio in the wireless device previously used to communicate with the CDMA wireless network. These are merely examples, and the identifiers may be used to trigger the wireless device to perform a variety of other actions.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Overview

Figure 1:
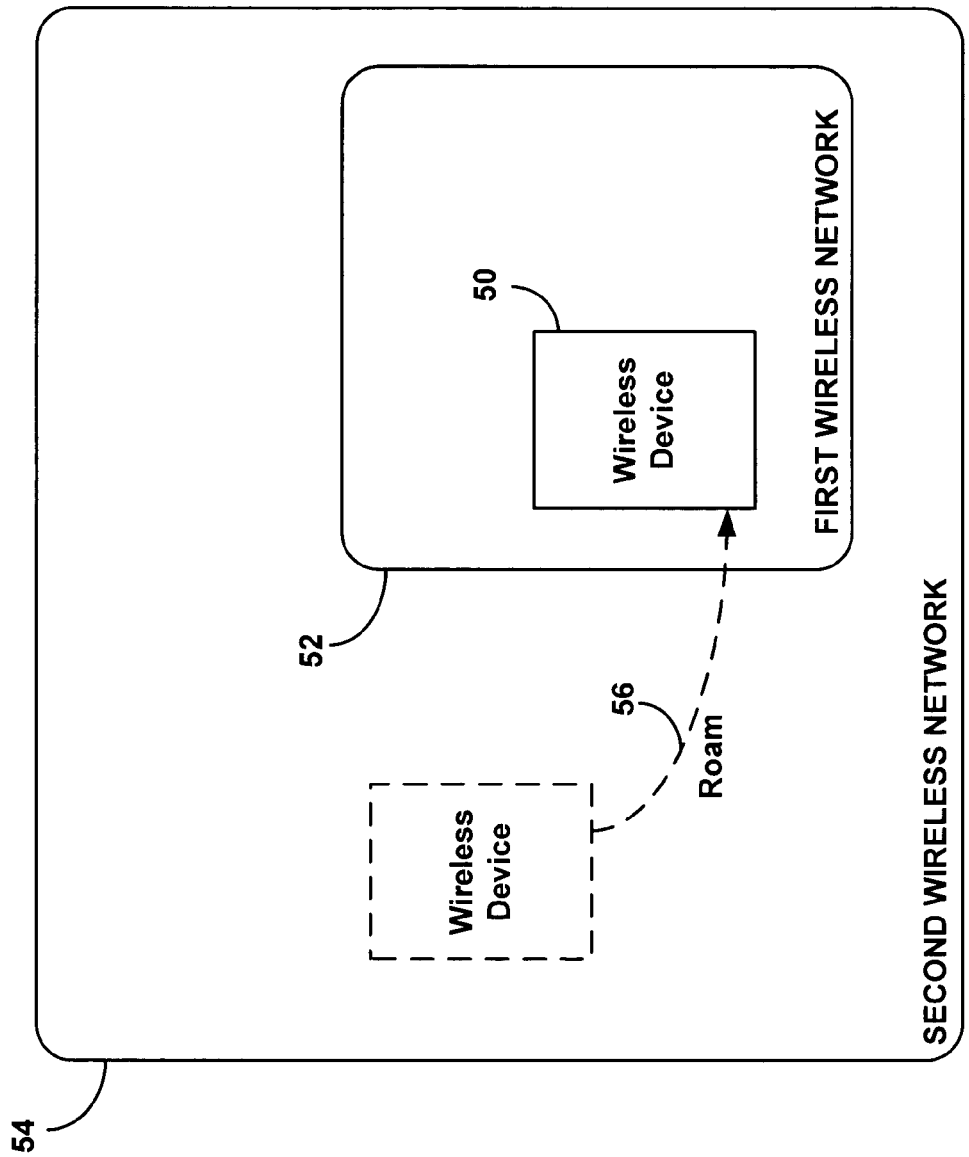
FIG. 1 is an illustration of an exemplary wireless device that can communicate with first and second wireless networks.

FIG. 1 is an illustration of an exemplary wireless device 50 that can communicate with a first wireless network 52 and a second wireless network 54, each of which may use a different air interface protocol. The wireless device 50 may communicate with other devices on the first or second wireless networks 52, 54 in order to exchange voice, data or other types of information. The first and second wireless networks 52, 54 may optionally provide connectivity to other networks, thereby also allowing the wireless device 50 to communicate with devices on those other networks. The first and second wireless networks 52, 54 may be any types of wireless networks. For example, the first wireless network 52 may be a WLAN that uses the IEEE 802.11 air interface protocol, and the second wireless network 54 may be a WWAN that uses the CDMA air interface protocol.

IEEE 802.11 and CDMA are merely examples of air interface protocols that can be used by the first and second wireless networks 52, 54. While the examples herein may refer to these particular air interface protocols, it should be understood that the first and second wireless networks 52, 54 may alternatively use other air interface protocols. Additionally, the first wireless network is not limited to being a WLAN, and the second wireless network is not limited to being a WWAN. Therefore, it should be understood that the labels "first" and "second" as used herein are merely arbitrary and are not used to refer to any specific type of wireless network or any specific air interface protocol.

In one embodiment, each service provider of a wireless network is assigned a unique identifier (e.g., a Carrier ID in a CDMA wireless network) to use for its wireless networks. All the access points for a service provider's wireless network are then configured to broadcast that identifier, thereby allowing the wireless device 50 to distinguish between different wireless networks. A service provider might be allocated more than one identifier, such as when the service provider provides more than one type of wireless network. For example, one identifier might be used for a service provider's WWAN, while another identifier might be used for the service provider's WLAN. Alternatively, one of the service provider's wireless networks may be sub-divided, with each subdivision using its own unique identifier. Other methods of distributing identifiers are also possible.

The first and second wireless networks 52, 54 may be provided by the same service provider, or they may be provided by different service providers. In one exemplary implementation, access points for the first wireless network 52 would broadcast a first identifier assigned to the first wireless network 52, and access points for the second wireless network 54 would broadcast a second identifier assigned to the second wireless network 54. The identifiers can then be received by wireless devices that are within range of the access points regardless of whether the wireless devices have an established connection with the access points' wireless networks.

In one embodiment, the access points for the first and second wireless networks 52, 54 use the same air interface protocol to broadcast their respective identifiers. As previously described, the first wireless network 52 may be an IEEE 802.11 wireless network, and the second wireless network 54 may be a CDMA wireless network. Both wireless networks, however, may use the CDMA air interface protocol to transmit their respective identifiers. In order to transmit the identifier using this air interface protocol, access points for the first wireless network 52 may include a CDMA transmitter in addition to an 802.11 radio.

The wireless device 50 may be communicating with the second wireless network 54 via a CDMA air interface and move within range of the first wireless network 52. Alternatively the wireless device 50 might not be communicating with the second wireless network 54 but may have its CDMA radio powered-up when it moves within range of the first wireless network 52. Since an access point for the first wireless network 52 transmits its identifier via a CDMA air interface, the wireless device 50 can then receive that identifier using the wireless device's CDMA radio, which is already powered-up. In addition, the wireless device 50 may also receive the identifier from the second wireless network via a CDMA air interface.

The wireless device 50 may use the different identifiers transmitted by the access points for the first and second wireless networks 52, 54 as a basis for performing one or more predetermined actions. For example, in one embodiment, the wireless device 50 includes logic that allows the wireless device 50 to use the identifiers received by the wireless device 50 as a basis for selecting between the different available wireless networks. The logic may also allow the wireless device 50 to determine, based on the identifiers, the air interface protocol used by the wireless networks. For example, the wireless device 50 may apply this logic to the first identifier received from an access point for the first wireless network 52 and to the second identifier received from an access point for the second wireless network 54. In applying this logic, the wireless device 50 may determine that the wireless device 50 should preferably communicate with the first wireless network 52 rather than the second wireless network 54 and may also determine that the first wireless network 52 uses the 802.11 air interface protocol.

In response to this determination, the wireless device 50 may perform one or more predetermined actions. For example, the wireless device 50 may power-up an 802.11 radio in the wireless device 50 that can be used to communicate with the first wireless network 52 and may then use the 802.11 radio to check the availability of the first wireless network 52. If the first wireless network 52 is available, then the wireless device 50 may begin accessing the first wireless network 52 for voice and/or data services, such as by establishing a connection with the first wireless network 52. The wireless device 50 may additionally handoff an existing voice or data session from the second wireless network 54 to the first wireless network 52, terminate a connection with the second wireless network 54, and/or power-down a radio in the wireless device 50 that the wireless device 50 previously used to communicate with the second wireless network 54.

Thus, in one embodiment, the identifiers are used to alert the wireless device 50 to the potential availability of the first wireless network 52 when the wireless device's 802.11 radio is not powered-up. This can efficiently allow the wireless device 50 detect the availability of the first wireless network 52 without requiring the wireless device 50 to periodically power-up its 802.11 radio or to continually leave its 802.11 radio powered-up. Of course these are merely examples, and the identifiers broadcast by the access points can be used to trigger the wireless device 50 to perform a variety of other predetermined actions as well.

2. Exemplary WLAN and WWAN Architectures

Figure 2:
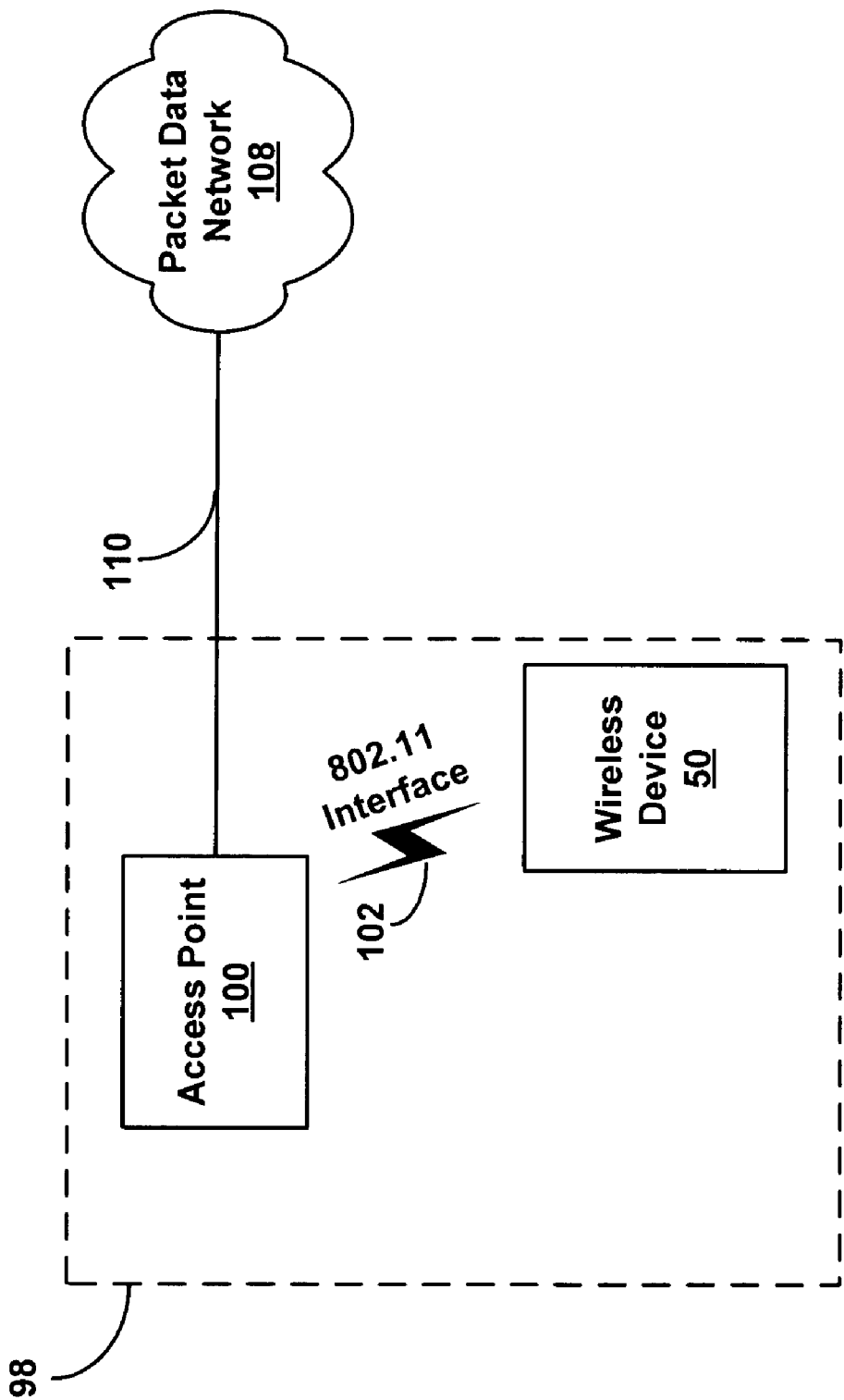
FIG. 2 shows an exemplary architecture for a WLAN that can be used as the first wireless network of FIG. 1.

FIG. 2 is an exemplary architecture for a WLAN that can be used as the first wireless network 52 of FIG. 1. Wireless devices on the WLAN 98 may communicate using one or more of the various IEEE 802.11 standards. IEEE 802.11 specifies various signaling and formatting protocols that can be used by devices on the WLAN 98. For example, IEEE 802.11 provides protocols for a physical ("PHY") layer, which is used to transmit bits of information over a wireless interface. IEEE 802.11 also defines a media access control ("MAC") sub-layer, which can be used to format the bits sent over the wireless interfaces using one of the PHY layer protocols.

The WLAN 98 in FIG. 2 is depicted in a basic service set ("BSS") configuration. In the BSS configuration, one or more wireless devices connect with an access point ("AP") 100. The wireless device 50 communicates with the AP 100 over an 802.11 wireless interface 102. The wireless device 50 might be any type of wireless device, such as a mobile phone, two-way pager, two-way radio, personal digital assistant, Internet appliance, wirelessly-equipped computer or another wireless device. Although FIG. 2 only depicts a single wireless device 50, the WLAN 98 may alternatively include more than one wireless device.

In the BSS configuration, the wireless device 50 can exchange data with another wireless device on the WLAN 98 through the AP 100. For example, a second wireless device (not shown) can send messages to the wireless device 50, and those messages may be routed through the AP 100 to the wireless device 50. Similarly, the wireless device 50 may send messages to the second wireless device, and those messages may also be routed through the AP 100 and then to the second wireless device. Other devices communicating with the AP 100 may exchange messages in a similar manner.

In addition to the BSS configuration, multiple APs can be linked together to form an extended services set ("ESS"). Thus, an ESS can include two or more BSSs. The APs can be linked in a variety of different manners, such as through a wired Ethernet connection. Once linked together, wireless devices communicating with one AP can exchange data with wireless devices connected to a different AP. Additionally, a wireless device can roam among the different wireless access points in the ESS. Thus, an ESS configuration can extend the range of the WLAN 98 past that of a BSS configuration.

The AP 100 may in turn connect to a packet data network 108 via a data link 110. The data link 110 may be a wired or wireless connection. The packet data network 108 may be any type of packet data network, such as an intranet or the Internet. The packet data network 108 may additionally provide connectivity to one or more other packet data networks. Using the connectivity between the AP 100 and the packet data network 108, the wireless device 50 may communicate with a device on the packet data network 108.

The WLAN 98 depicted in FIG. 2 may use any of the various 802.11 standards. For example, it may use the 802.11a, 802.11b, 802.11g or other standards under the 802.11 umbrella. It should be understood, however, that IEEE 802.11 is merely exemplary in nature. The first wireless network 52 may use other radio protocols. For example, the first wireless network 52 may alternatively be an IEEE 802.16 network, an IEEE 802.20 network, a HomeRF network, a HiperLAN, a Bluetooth network, a multichannel multipoint distribution services ("MMDS") network, a digital enhanced cordless telecommunications ("DECT") network, a WWAN or another type of wireless network.

Figure 3:
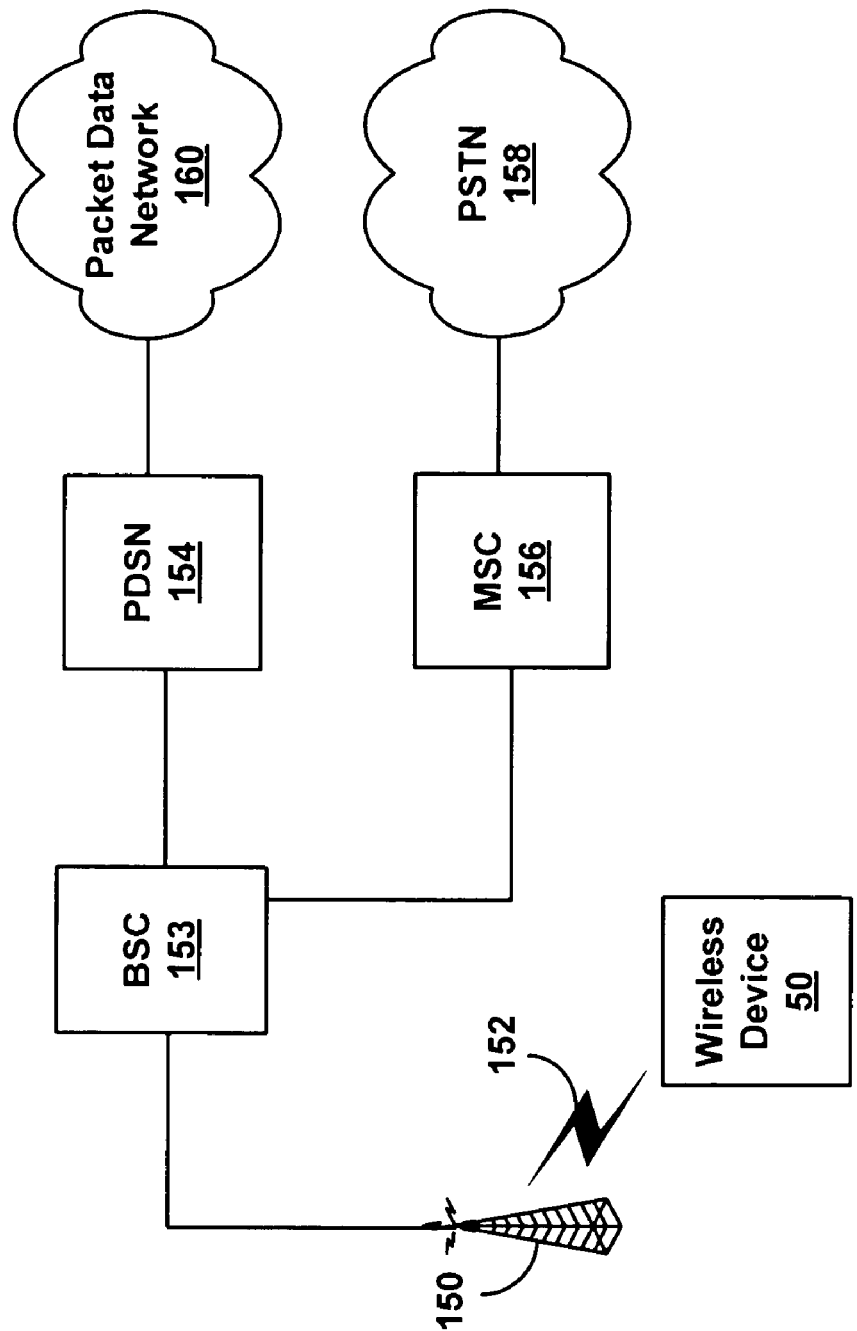
FIG. 3 shows an exemplary architecture for a WWAN that can be used as the second wireless network of FIG. 1.

FIG. 3 shows an exemplary architecture for a WWAN that can be used as the second wireless network of FIG. 1. As shown in FIG. 3, the wireless device 50 communicates with a base transceiver station ("BTS") 150 via an air interface 152. The wireless device 50 can communicate with the BTS 150 using a variety of different protocols. In one exemplary embodiment, the wireless device 50 communicates with the BTS 150 via the air interface 152 using Code Division Multiple Access ("CDMA").

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other wireless protocols may also be used. For example, the wireless device 50 and the base station 150 may communicate using Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), IS-136, Time Division Multiple Access ("TDMA"), IEEE 802.11, IEEE 802.16, IEEE 802.20, Bluetooth, MMDS, DECT, integrated digital enhanced network ("IDEN") or other protocols.

The BTS 150 connects to a base station controller ("BSC") 152, which in turn connects to a packet data serving node ("PDSN") 154. The PDSN 154 connects to a packet data network 160. Using this connectivity, the wireless device 50 may then communicate with devices on the packet data network 160. Alternatively, the wireless device 50 might use an Internetworking Function ("IWF") in order to engage in packet data communications with another device on the WWAN or on the packet data network 160. Depending on the particular type of WWAN, other methods might also be used to provide the wireless device 50 with access to the packet data network 160.

Alternatively, the wireless device 50 may access the WWAN by placing a traditional voice call. The BSC 153 may connect to a mobile switching center ("MSC") 156, which in turn may connect to the public switched telephone network ("PSTN") 158. The wireless device 50 may use this connectivity to form a circuit-switched connection with another device on the PSTN 158. The wireless device 50 may then send voice traffic to the other device over this connection; however, the wireless device 50 may also send data over this type of connection. Other types of circuit-switched connections may be used.

It should be understood, however, that the wireless networks depicted in FIGS. 2 and 3 are merely exemplary in nature. For example, it is not necessary that the first wireless network 52 be a WLAN but might alternatively be any other type of wireless network. Also, the second wireless network 54 might be a different type of WWAN than depicted in FIG. 3 or might be a wireless network other than a WWAN. Also, it is also not necessary that any one particular wireless network has a larger coverage area than the other wireless network nor is it necessary that the coverage areas of the two wireless networks overlap. Still alternatively, the wireless device 50 might communicate with a greater or fewer number of wireless networks than are depicted in FIG. 1.

Figure 4:
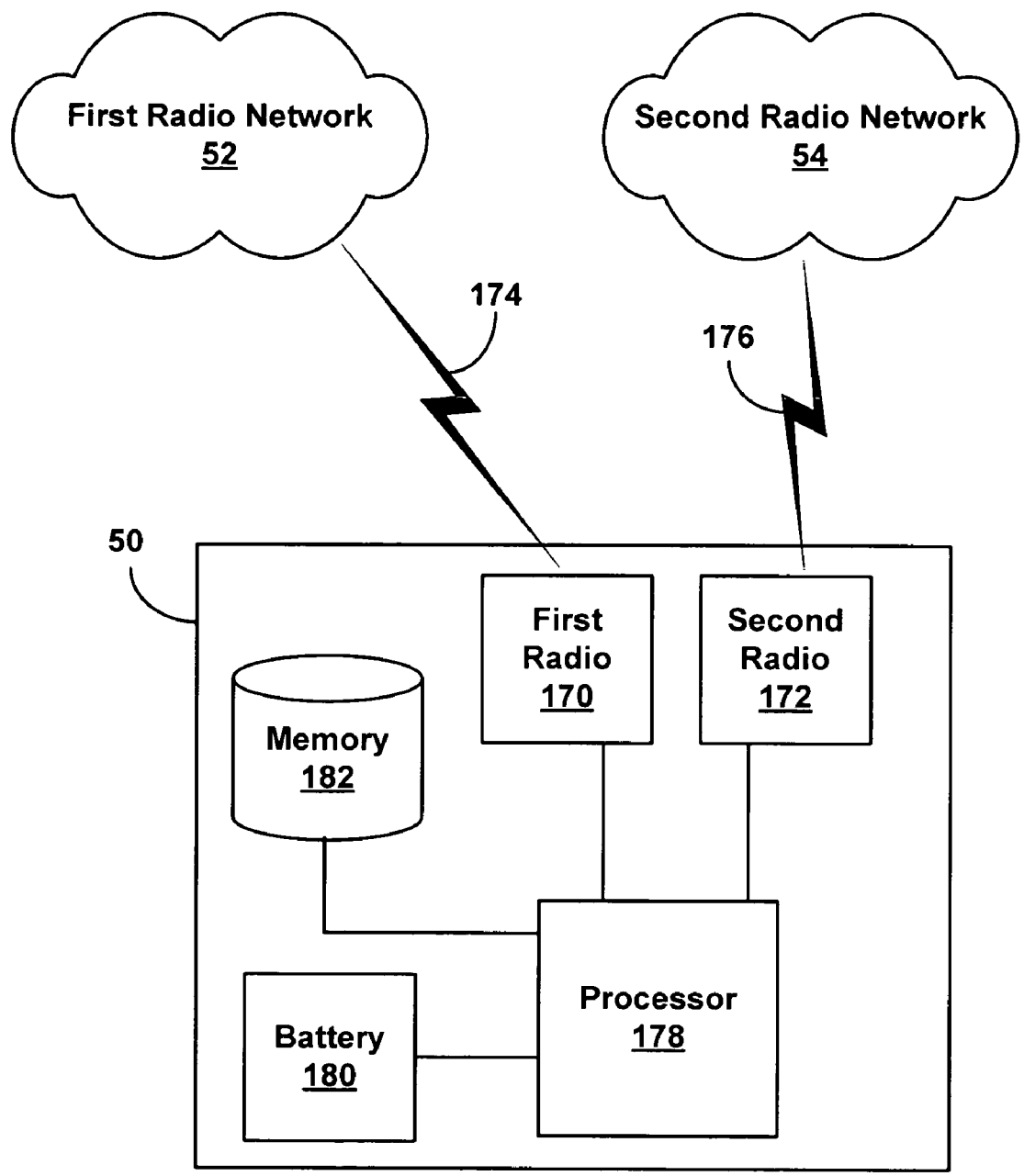
FIG. 4 is a block diagram illustrating exemplary components in the wireless device that can be used to communicate with the first and second wireless networks of FIG. 1.

FIG. 4 is a block diagram illustrating exemplary components in the wireless device that can be used to communicate with the first and second wireless networks of FIG. 1. As shown in FIG. 4, the wireless device 50 includes a first radio 170 for communicating with the first wireless network 52 via a first wireless interface 174. The wireless device 50 also includes a second radio 172 for communicating with the second wireless network 54 via a second wireless interface 176. The radios 170, 172 may vary with the types of the first and second wireless networks 52, 54.

As previously described, in one exemplary embodiment the first wireless network 52 may be a WLAN and the second wireless network 54 may be a WWAN. Thus, the first radio 170 may be a WLAN radio, and the second radio 172 may be a WWAN radio. Thus, in one exemplary embodiment, the first wireless interface 174 may be the 802.11 interface 102 of FIG. 2, and the second wireless interface 176 may be the air interface 152 of FIG. 3. However, the particular types of wireless interfaces 174, 176 may vary with the particular types of wireless networks.

The radios 170, 172 may be separate components in the wireless device 50. For example, they may be separate application specific integrated circuits ("ASICs"), antenna systems or other separate components. Alternatively, the radios 170, 172 may be integrated into a single ASIC, such as a dual mode ASIC. The radios 170, 172 may also be integrated into a single component in the wireless device 50 other than an ASIC. Although FIG. 4 depicts two radios 170, 172 in the wireless device 50, the wireless device 50 may include a greater or fewer number of radios, and therefore the wireless 50 may communicate with a greater or fewer number of wireless networks.

In one exemplary embodiment, the first radio 170 is a WLAN radio module capable of communicating using the IEEE 802.11 protocol. The wireless device can use the WLAN radio module, for example, to access the WLAN of FIG. 2. In another exemplary embodiment, the second radio 172 is a WWAN radio module capable of communicating using CDMA. Once connected to the wireless device 50, the wireless device 50 can use the WWAN radio module to communicate with the WWAN of FIG. 3. These radio modules are merely exemplary in nature, and the wireless device 50 may include radio modules that can communicate with a variety of other types of wireless networks.

The radio modules may connect to the wireless device 50 in a variety of different ways. For example, radio modules may connect to the wireless device 50 through a serial port, a parallel port, a Personal Computer Memory Card International Association ("PCMCIA") slot, a Universal Serial Bus ("USB") port, a SDIO slot, a compact flash slot, a firewire connection or another type of connection. Thus, the radio modules may be removable such that a user of the wireless device 50 can add or remove radio modules in order to change the wireless networks with which the wireless device 50 can communicate. Alternatively, the radio modules may be permanently connected to the wireless device 50 such that a user of the wireless device 50 cannot add or remove radio modules.

As illustrated in FIG. 4, a processor 178 connects to the first radio 170 and second radio 172 and may control their operation. The processor 178 may additionally control the operation of other components in the wireless device 50. The processor 178 may further interface with a battery 180, which supplies power to the processor 178 and other components in the wireless device 50. The processor 178 may also connect to memory 182, which can store programs, data or other information used by the processor 178.

In order to conserve battery power, the wireless device 50 may power-down the radios 170, 172 when the wireless device 50 is not communicating with their respective wireless networks 52, 54. Even when the radios 170, 172 are included in a single chip, they may be independently powered-up and powered-down. That is, while one radio is powered-up, the other radio might be powered-down. Alternatively, the radios might both be powered-up or powered-down at the same time.

3. Using Identifiers Broadcast by Access Points to Trigger Events

Figure 5:
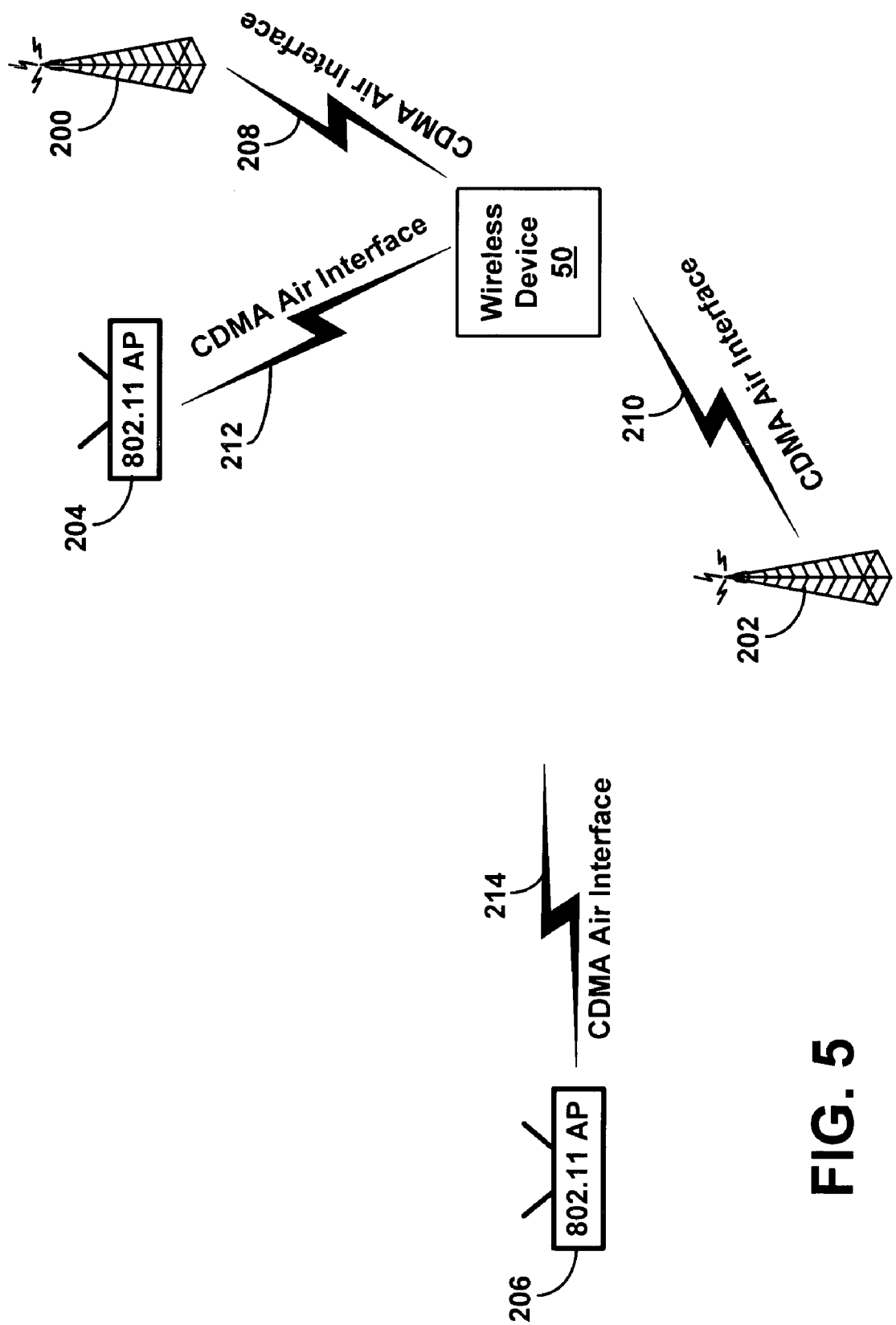
FIG. 5 is a block diagram of an exemplary configuration in which access points for first and second types of wireless networks each use a first air interface protocol to broadcast respective identifiers to wireless devices.

FIG. 5 is a block diagram of an exemplary configuration in which access points for first and second types of wireless networks each use a first air interface protocol to broadcast respective identifiers to wireless devices. When the wireless device 50 is within range of one or more of the access points, it may receive the respective identifiers broadcast by the access points, which may be used to trigger the wireless device 50 to perform one or more predetermined actions, such as checking the availability of a wireless network, handing off between wireless networks, powering up or down radios in the wireless device 50 or other various actions.

This figure depicts an exemplary configuration that includes first and second CDMA base stations 200, 202, although CDMA is merely exemplary in nature and other air interface protocols might alternatively be used. The first and second CDMA base stations 200, 202 may be part of the same CDMA wireless network, or they may be part of different CDMA wireless networks, which may in turn be provided by different service providers or the same service provider. The figure additionally depicts first and second 802.11 APs 204, 206, which may be part of the same 802.11 wireless network or part of different 802.11 wireless networks that again may be provided by the same service provider or by different service providers.

At various locations, the wireless device 50 can be simultaneously within range of two or more access points, and the wireless device 50 could potentially communicate with any one of these different access points in order to access their respective networks. FIG. 5 depicts the wireless device 50 as being within range of the first and second CDMA base stations 200, 202 and the first 802.11 AP 204; however, it is out of range of the second 802.11 AP 206. Although the wireless device 50 could access any one of the different wireless networks with which the wireless device 50 is in range, it may be preferable for the wireless device 50 access one of these available wireless networks rather than the other available wireless networks.

Many different factors may be considered in selecting between available wireless networks. For example, a user of the wireless device 50 may subscribe to service from a particular service provider (e.g., Sprint PCS®), referred to herein as a "home" service provider. For instance, the user may enter into a service contract in which the user pays a flat monthly rate to the home service provider and in return receives a preset number of minutes of access each month to the home service provider's wireless network. The user of the wireless device 50 is typically not assessed any additional charges for accessing the home service provider's wireless network within the allotted number of minutes. Therefore, if the wireless device 50 is within range of an access point for the home service provider's wireless network, then it would be preferable for the wireless device 50 communicate with that access point in order to access the home service provider's wireless network. This may be the case even though wireless device 50 may be closer to and/or receive a stronger signal from an access point for a different service provider's wireless network.

The wireless device 50 may roam among various physical locations and may even roam outside the coverage area of the home service provider's wireless network. Therefore, the wireless device 50 might not always be able to access its home service provider's wireless network. Even when the wireless device 50 roams outside the coverage area of the home service provider's wireless network, the wireless device 50 may still receive service by accessing a wireless network of a different service provider, referred to herein as a "roaming" service provider. Here again the wireless device 50 may be able to communicate with multiple different access points that are each associated with a different wireless network provided by different roaming service providers. Although the wireless device 50 may access any one of these roaming service provider's wireless networks, it still may be preferable for the wireless device 50 to access the wireless network of one of the roaming service providers rather than the wireless networks of the other roaming service providers, and this selection between the roaming service providers may also be based on a variety of different factors.

For example, the user of the wireless device 50 is typically assessed an additional charge (e.g., a per minute charge) for accessing a roaming service provider's wireless network. However, different roaming service providers may assess different charges for allowing the wireless device 50 access their respective wireless networks. Therefore, it may be preferable for the wireless device 50 to access the wireless network of the roaming service provider that assesses the lowest charge. This may be the case even though the wireless device 50 is closer to an access point for a different roaming service provider or even though the wireless device 50 may receive a stronger signal from an access point for a different roaming service provider.

The wireless device 50 can use identifiers broadcast by the access points to determine which service provider is associated with a particular access point and thereby also as a basis to select between the available wireless networks. For example, each service provider may be assigned one or more identifiers that are unique to that service provider. Where the service provider is assigned a single identifier, the service provider may configure its wireless network such that all access points broadcast that single identifier. Alternatively, the service provider may be assigned multiple identifiers. In this case, the service provider may subdivide its wireless network, for example by dividing the wireless network into different geographical regions, and then use a different identifier for each subdivision. These are merely examples, and other methods may be used to subdivide the service provider's wireless network when the service provider is allocated more than one identifier.

The particular method an access point uses to broadcast the identifier, as well as the particular format of the identifier itself, generally varies depending on the air interface protocol used by the access point. For example, the previously described CDMA standards define identifiers called Carrier IDs, which are broadcast by access points in those types of networks. The CDMA standards additionally specify the signaling channels and message formats that are used by the access points to broadcast the Carrier IDs. Therefore, if the access point is a BTS 150 in a CDMA network, such as was described with respect to FIG. 3, the BTS 150 may implement the Carrier ID mechanisms defined in the applicable CDMA standard(s).

If the access point uses an air interface protocol other than CDMA, then the access point may use an identifier other than a Carrier ID, and the access point may use mechanisms for broadcasting that identifier other than those defined in the various CDMA standards. The identifiers and the methods for broadcasting the identifier may be defined in the air interface protocol standard(s) for that wireless network, or alternatively the access point may use proprietary or non-standardized methods for defining and/or broadcasting the identifier. This may also be the case for a CDMA network, which may alternatively use proprietary or non-standardized methods for defining and/or broadcasting a Carrier ID or another identifier.

In one embodiment for selecting between the wireless networks based on the identifiers, the wireless device 50 stores a Preferred Roaming List ("PRL"). The PRL may take many different formats depending on the service provider and the wireless device 50, but generally includes information that allows the wireless device 50 to prioritize among the available wireless networks based on the identifiers broadcast by their respective access points. In one simplistic implementation, the PRL may be an ordered list of all the identifiers assigned to various service providers. Upon receiving multiple identifiers, the wireless device 50 can select the identifier that is ranked highest in the order list and then access the wireless network of the access point broadcasting that identifier. In other implementations, the PRL may include additional information that allows the wireless device 50 to implement more complex algorithms for selecting among access points based on their respective identifiers.

In one embodiment, the home service provider for the wireless device 50 creates the PRL. The home service provider may create the PRL so as to give preference to the home service provider's wireless networks, and the home service provider may also create the PRL to give preference to any roaming service provider's wireless networks with which the home service provider has established roaming agreements or other agreements in order to lower the roaming charges assessed by the roaming service provider when the home service provider's subscribers access the roaming service provider's wireless network. In creating the PRL for a particular wireless device, the home service provider may also take into account the service plan for the wireless device. These are merely examples, and the home service provider may use other factors in creating the PRL.

Once the home service provider has created the PRL, it may then initiate a download of the PRL to the wireless device 50. The home service provider may download the PRL to the wireless device 50 at periodic intervals, such as once a month, but other intervals are also possible. Periodical downloads can allow the home service provider to update the PRL used by the wireless device 50 in order to account for any changes in the criteria used to select among wireless networks (e.g., new roaming agreements, newly assigned identifiers, etc. . . . ). Alternatively, the home service provider might only initiate a download of the PRL to the wireless device 50 when the PRL has changed relative to the previous version used by the wireless device 50, or the home service provider might use a combination of these or other methods in order to download the PRL to the wireless device 50.

Still alternatively, the wireless device 50 itself might send a request to the home service provider to download the PRL. This may be in addition to or in place of any downloads initiated by the home service provider. In one embodiment, the PRL is not modifiable by a user of the wireless device 50; however, in another embodiment a user of the wireless device 50 may modify the PRL, thereby allowing both the home service provider and the user of the wireless device to specify how the wireless device 50 selects among the various identifiers it receives from different access points. It should be understood, however, that these are merely examples and that there may be other methods for creating, modifying and providing the PRL to the wireless device 50.

In one embodiment, the identifiers are allocated among different types of wireless networks. For example, a wireless service provider may provide first and second wireless networks, each of which uses a different air interface protocol. For example, the first wireless network may use a first air interface protocol (e.g., 802.11) and the second wireless network may use a second air interface protocol (e.g., CDMA). The service provider may then use two different identifiers—a first identifier and a second identifier—for these different wireless networks. Access points for the service provider's first wireless network would broadcast the first identifier, and access points for the service provider's second wireless network would broadcast the second identifier. As previously described, however, a particular wireless network may be subdivided such that more than one identifier is used for that wireless network.

Also, it is not necessary that the different wireless networks are provided by the same service provider. Thus, the first wireless network may be provided by a first service provider, and the second wireless network may be provided by a second service provider. Additionally, other embodiments may use a greater number of networks. For example, multiple service providers may provide wireless networks that use the first air interface protocol, and multiple service providers may provide wireless networks that use the second air interface protocol. These wireless networks might each use their own identifier, such that one service provider's wireless network that uses the first air interface protocol uses one identifier while a second service provider's wireless network that also uses the first air interface protocol would use a different identifier. Additionally, while the examples discussed herein refer to wireless networks using first and second air interface protocols, the principles may be extended to a collection of wireless networks that encompasses more that two air interface protocols.

Where the identifiers are used for different types of networks, the PRL for the wireless device 50 may include additional information that allows the wireless device 50 to determine an air interface protocol corresponding to the wireless network for a particular identifier. This additional information may be provided in a variety of different ways. For example, each identifier stored in the PRL may have a corresponding field that stores an indicator of the corresponding air interface protocol. In another example, an indication of the air interface protocol may be encoded into the identifier. Other methods of determining an air interface protocol corresponding to a given identifier are also possible.

As previously described, the wireless device 50 is capable of communicating with wireless networks that use different air interface protocols. For example, the wireless device 50 might include radios for communicating with CDMA networks and 802.11 networks; however, the wireless device 50 might alternatively be able to communicate with other types of wireless networks. The access points for these two different types of networks may broadcast respective identifiers, which the wireless device 50 can use to select between the various available wireless networks. In addition, the wireless device 50 may also use these identifiers to trigger the wireless device 50 to perform one or more different actions. For example, the identifiers may be used to trigger the wireless device 50 to check the availability of a wireless network, establish a connection with a wireless network, handoff between different types of wireless networks or perform a variety of other actions.

Each access point 200-206 may be assigned an identifier to broadcast to wireless devices. In this example, all the access points 200-206 broadcast different identifiers; however, as previously described one or more of the access points 200-206 might alternatively broadcast the same identifier. FIG. 5 depicts air interfaces 208-214 used by the access points 200-206 to broadcast their respective identifiers. In this embodiment, all of the access points 200-206 use the same air interface protocol—CDMA—to broadcast their respective identifiers. That is, even the 802.11 APs 204, 206 for 802.11 wireless networks use the CDMA air interface to broadcast their respective identifiers. CDMA is merely exemplary in nature, however, and other air interface protocols may be selected as the common air interface protocol used by all the access points 200-206 to broadcast their respective identifiers.

Figure 6:
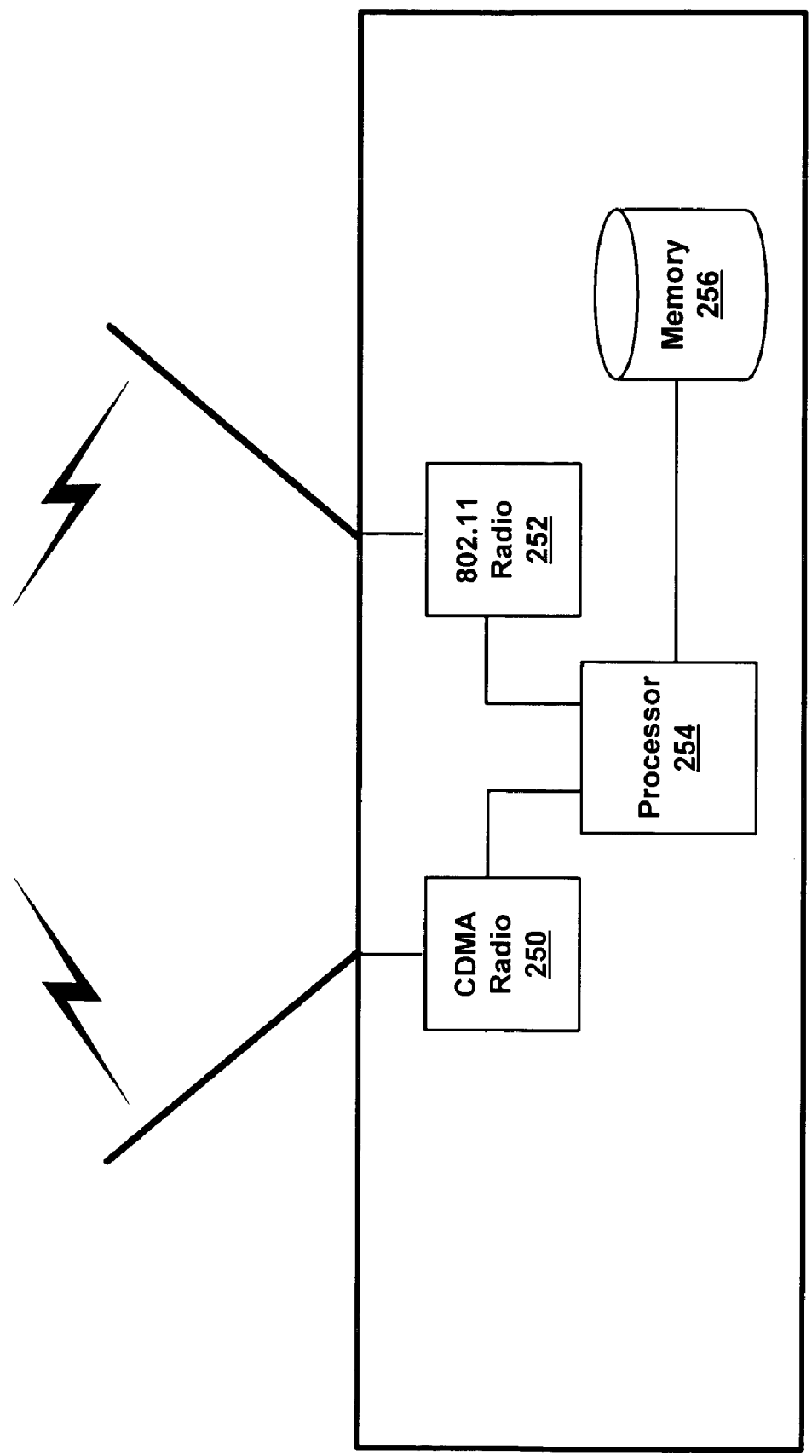
FIG. 6 is a block diagram of an exemplary 802.11 access point that uses a protocol other than 802.11 to broadcast an identifier to wireless devices.

FIG. 6 is a block diagram of an exemplary 802.11 AP that uses a protocol other than 802.11 to broadcast an identifier to wireless devices. This AP may be used, for example, as either of the 802.11 APs 204, 206 of FIG. 5. As depicted in this figure, the access point includes a CDMA radio 250 for communicating via a CDMA air interface and an 802.11 radio 252 for communicating via an 802.11 air interface. The access point uses the CDMA radio 250 to broadcast its identifier, and it uses the 802.11 radio to communicate with wireless devices in order to provide them with access to the 802.11 wireless network. As illustrated, the access point additionally includes a processor 254 and memory 256, which can be used to store various information and programs.

Returning to FIG. 5, the wireless device 50 is within range of the first and second CDMA base stations 200, 202 and also the first 802.11 AP 204; however, the wireless device 50 is out of range of the second 802.11 AP 206. In this position, the wireless device 50 receives identifiers from the first and second CDMA base stations 200, 202 and also the first 802.11 AP 204. The wireless device 50 receives these identifiers via the CDMA air interface, and therefore would receive these identifiers when its CDMA radio is powered-up—regardless of whether its 802.11 radio is also powered-up. Once the wireless device 50 receives the three identifiers, it can use those identifiers to trigger the wireless device 50 to perform one or more predetermined actions.

For example, the wireless device 50 may receive the identifiers and then access the PRL to determine which wireless network corresponding to one of the three identifiers the wireless device 50 should preferably access. As part of this process, the wireless device 50 may also determine the air interface protocol used by that wireless network. If the corresponding air interface protocol is the same as the air interface protocol used to send and receive the identifiers (e.g., CDMA), then the wireless device 50 may simply continue to use its CDMA radio to establish a connection with that wireless network or, if the wireless device is already accessing that wireless network, to continue an existing connection with that wireless network.

However, the air interface protocol of the wireless network that the wireless device 50 should preferably access may be different than the air interface protocol used to send and receive the identifiers. For example, the wireless device 50 may determine that it should communicate with the 802.11 AP 204 in order to access the 802.11 AP's corresponding 802.11 wireless network. In this case, the wireless device 50 may responsively power-up its 802.11 radio in order to communicate with the 802.11 AP 204 via an 802.11 interface. The wireless device 50 may then check for the availability of the 802.11 wireless network, and if it is available, proceed to establish a connection. The wireless device 50 may perform other actions, such as handing off an existing voice or data session to the 802.11 wireless network, terminating an existing connection with a different wireless network, or powering-down a radio other than the 802.11 radio.

Thus, the identifiers may advantageously be used to allow the wireless device 50 to detect the availability of a wireless network (e.g., an 802.11 wireless network) and to then begin communicating with the wireless network. As previously described, the wireless device 50 may already be communicating with a CDMA or other type of network. In order to conserve power, however, the wireless device 50 may have powered-down its 802.11 radio and therefore would not be able to detect the advertisements broadcast by 802.11 APs in order to alert wireless devices to their availability. Since the identifiers are broadcast using an air interface protocol other than 802.11, the wireless device 50 can quickly and efficiently detect the availability of an 802.11 network without having its 802.11 radio powered-up.

Some air interface protocols typically support a greater range than other air interface protocols. For example, CDMA signals can typically be transmitted over a longer distance than 802.11 signals. This might lead to the undesirable situation where the identifier for an access point (e.g., transmitted via a CDMA air interface) might be broadcast over a longer distance than the signals for the air interface protocol (e.g., 802.11) for the access point's wireless network. If the wireless device 50 were to receive the identifier transmitted over this longer distance, the wireless device 50 it might determine that it should communicate with the 802.11 network, but since the identifier is transmitted over a longer distance than the access point's 802.11 signals, the wireless device might not be within range of the 802.11 network.

In order to reduce the possibility of such an occurrence, access points broadcasting an identifier might reduce the range the identifier is broadcast to approximately the range of signals for their respective wireless network. This may be done, for example, by limiting the power used to transmit the identifiers. Where the identifier is transmitted via a CDMA air interface, for example, the access point might power limit the range of the identifier to approximately the range of the access point's 802.11 signals.

4. Exemplary Operation

Figure 7:
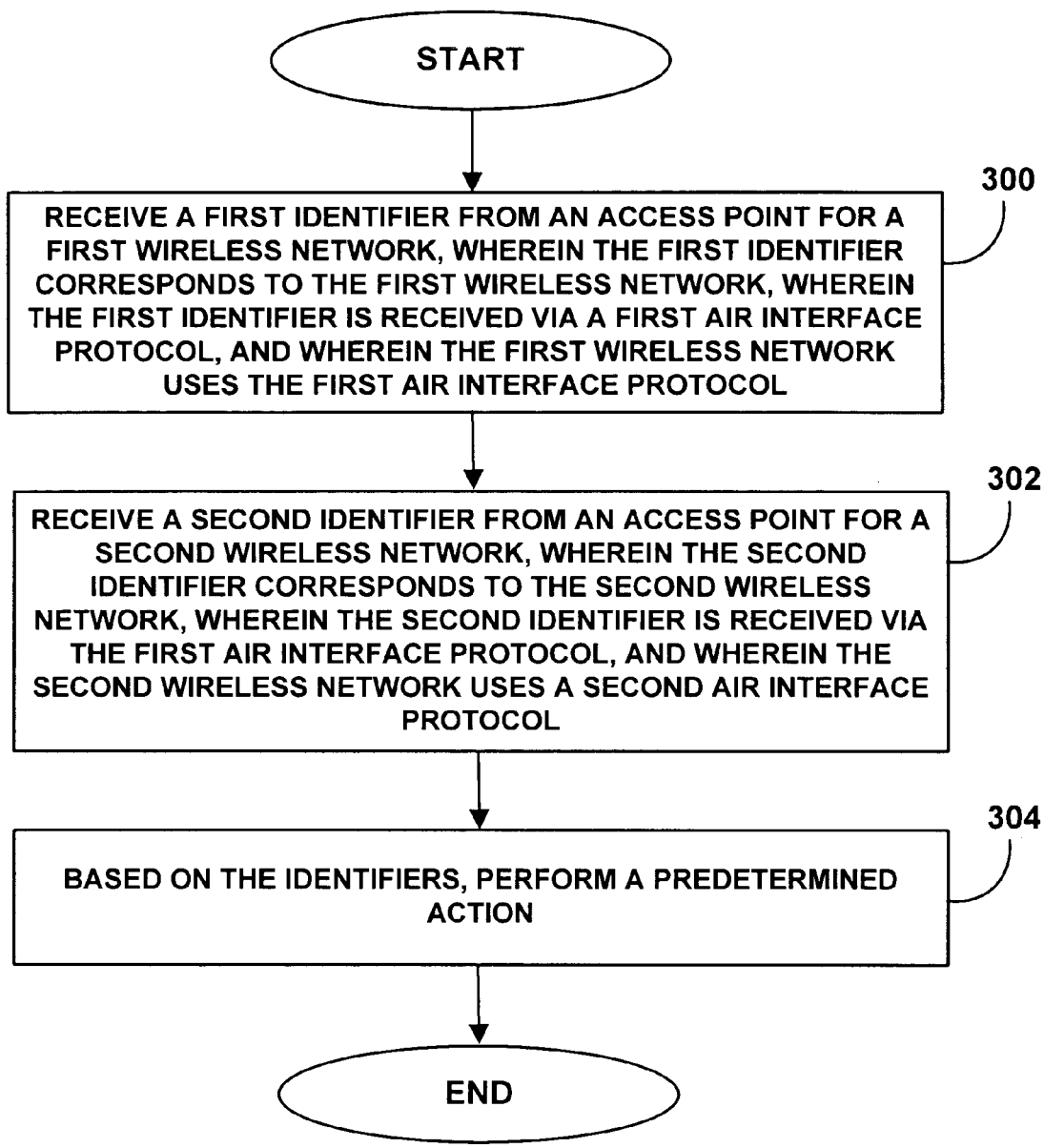
FIG. 7 is a flowchart of an exemplary method for using identifiers transmitted by access points to trigger a wireless device to perform a predetermined action.

FIG. 7 is a flowchart of an exemplary method for using identifiers transmitted by access points to trigger a wireless device to perform a predetermined action. At Step 300, the wireless device receives a first identifier from an access point for a first wireless network, wherein the first identifier corresponds to the first wireless network, wherein the first identifier is received via a first air interface protocol, and wherein the first wireless network uses the first air interface protocol. At Step 302, the wireless device receives a second identifier from an access point for a second wireless network, wherein the second identifier corresponds to the second wireless network, wherein the second identifier is received via the first air interface protocol, and wherein the second wireless network uses a second air interface protocol. At Step 304, the wireless device performs a predetermined action.

As previously described, the predetermined action may be, for example, checking the availability of a wireless network. In one embodiment, performing the predetermined action comprises using the identifiers to determine that the wireless device should communicate with the second wireless network rather than the first wireless network, and responsively checking the availability of the second wireless network. The wireless device may determine that it should communicate with the second wireless network rather than the first wireless network in a variety of different ways. In one embodiment, the wireless device accesses a preferred roaming list and uses the preferred roaming list to determine that the wireless device should communicate with the second wireless network rather than the first wireless network.

In various embodiments the identifiers are all broadcast using the first air interface protocol although some of the corresponding wireless networks may in fact use other air interface protocols. Thus, the wireless device may be able to receive identifiers from a variety of different types of wireless network with only a single radio in the wireless device powered-up. Therefore, in one embodiment, performing the predetermined action may comprise i) based on the identifier, determining that the wireless device should communicate with the second wireless network over the first wireless network, ii) using the second identifier, determining that the second wireless network uses the second air interface protocol, iii) powering-up a radio in the wireless device for communicating via the second air interface protocol, and iv) using the radio, checking an availability of the second wireless network.

Figure 8:
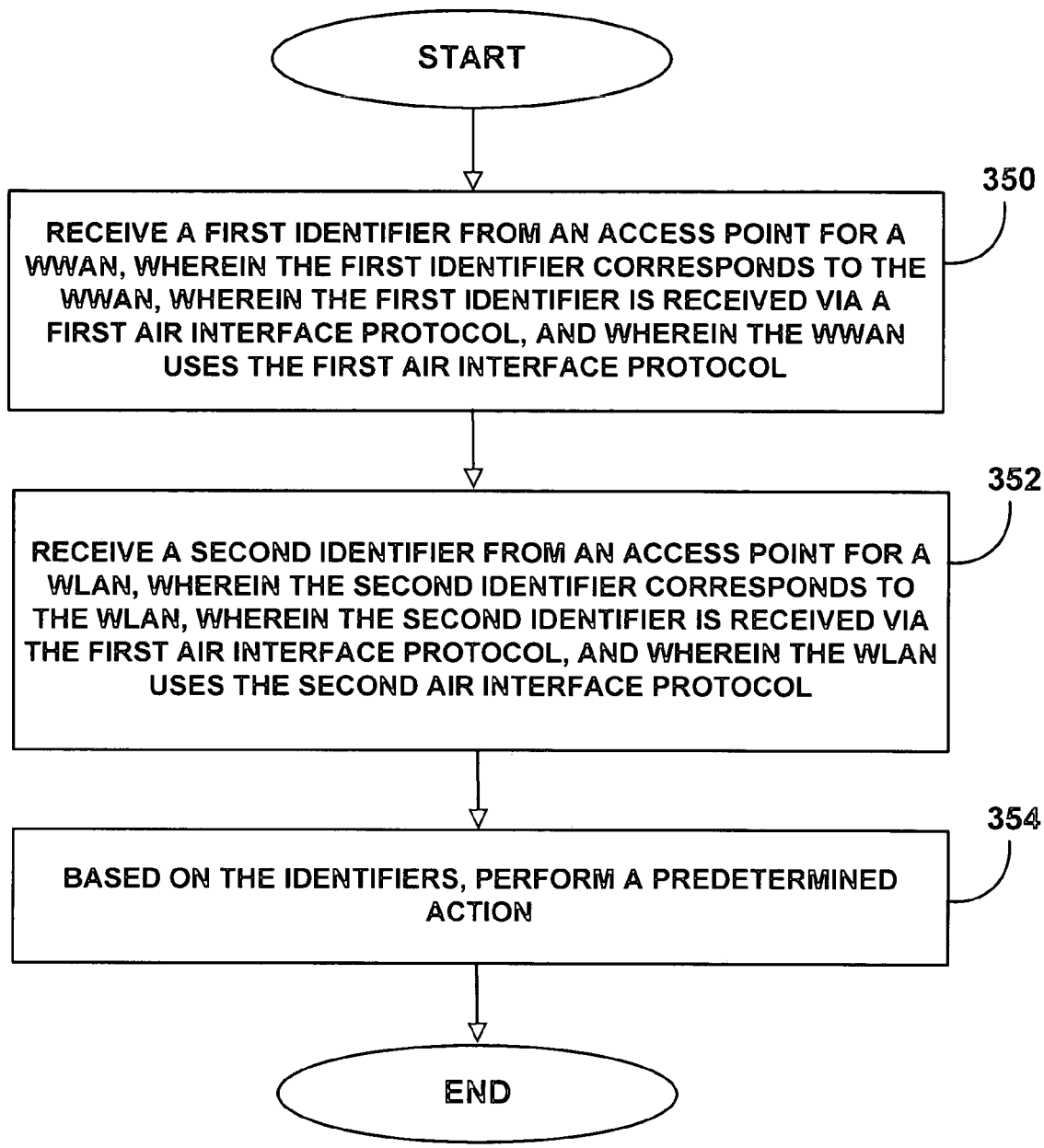
FIG. 8 is a flowchart of an alternate method for using identifiers transmitted by access points to trigger a wireless device to perform a predetermined action.

FIG. 8 is a flowchart of an alternate method for using identifiers transmitted by access points to trigger a wireless device to perform a predetermined action. At Step 350, the wireless device receives a first identifier from an access point for a WWAN, wherein the first identifier corresponds to the WWAN, wherein the first identifier is received via a first air interface protocol, and wherein the WWAN uses the first air interface protocol. At Step 352, the wireless device receives a second identifier from an access point for a WLAN, wherein the second identifier corresponds to the WLAN, wherein the second identifier is received via the first air interface protocol, and wherein the WLAN uses the second air interface protocol. At Step 354, the wireless device performs a predetermined action.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

We claim:

1. An access point for a wireless network comprising:
a transmitter for broadcasting to wireless devices an identifier via a wireless wide area network ("WWAN") air interface protocol, wherein the identifier identifies the access point as being associated with a group of access points; and
a radio for communicating with wireless devices via a wireless local area network ("WLAN") air interface protocol, wherein the wireless network uses the WLAN air interface protocol, and wherein a range of the identifier transmitted via the WWAN air interface protocol by the transmitter is approximately the same as a range of the radio for communicating with wireless devices via the WLAN air interface protocol.

2. The access point of claim 1, wherein the WWAN air interface protocol is CDMA, TDMA, AMPS, UMTS or GSM.

3. The access point of claim 1, wherein the WLAN air interface protocol is IEEE 802.11, IEEE 802.16, IEEE 802.20 or Bluetooth.

4. The access point of claim 1, wherein the WWAN air interface protocol is CDMA, and wherein the identifier is a Carrier ID.

5. An access point for a wireless local area network ("WLAN"), the access point comprising:
a radio for communicating with wireless devices in order to provide the wireless devices with access to the WLAN; and
a transmitter for transmitting to wireless devices an identifier associated with a service provider for the WLAN, wherein the transmitter transmits the identifier via an air interface protocol other than an air interface protocol for the WLAN, and wherein the transmitter is power limited such that a range of the identifier is approximately the same as a range of the radio for providing wireless devices with access to the WLAN.

6. The access point of claim 5, wherein the transmitter is a unidirectional transmitter, and wherein the radio is a bidirectional radio.

7. The access point of claim 5, wherein the air interface protocol for the WLAN is IEEE 802.11, IEEE 802.16, IEEE 802.20 or Bluetooth, and wherein the air interface protocol for transmitting the identifier is CDMA, TDMA, AMPS, UMTS or GSM.

8. A wireless communication system provided by a service provider, the wireless communication system comprising:
a first wireless network for communicating with wireless devices using a first air interface protocol;
a second wireless network for communication with wireless devices using a second air interface protocol;
at least one access point for the first wireless network, wherein the at least one access point for the first wireless network includes a transmitter for transmitting via the first air interface protocol a first identifier, wherein the first identifier is associated with the service provider and the first wireless network; and
at least one access point for the second wireless network, wherein the at least one access point for the second wireless network includes a transmitter for transmitting via the first air interface protocol a second identifier, wherein the second identifier is associated with the service provider and the second wireless network.

9. The system of claim 8, wherein the transmitter in the at least one access point for the second wireless network is power limited such that a range of the second identifier transmitted by the transmitter via the first air interface protocol is approximately the same as a range of the at least one access point for the second wireless network for communicating with wireless devices via the second air interface protocol.

10. The system of claim 8, wherein the first air interface protocol is CDMA, TDMA, AMPS or GSM, and wherein the second air interface protocol is IEEE 802.11, IEEE 802.16 or IEEE 802.20.

11. The system of claim 8, wherein the first air interface protocol is CDMA, TDMA, AMPS or GSM, and wherein the first and second identifiers are Carrier IDs.

12. A method for triggering a wireless device to perform a predetermined action, the method comprising:
receiving a first identifier from an access point for a first wireless network, wherein the first identifier corresponds to the first wireless network, wherein the first identifier is received via a first air interface protocol, and wherein the first wireless network uses the first air interface protocol;
receiving a second identifier from an access point for a second wireless network, wherein the second identifier corresponds to the second wireless network, wherein the second identifier is received via the first air interface protocol, and wherein the second wireless network uses a second air interface protocol;
based on the identifiers, performing a predetermined action.

13. The method of claim 12, wherein performing the predetermined action comprises:
based on the identifiers, determining that the wireless device should communicate with the second wireless network rather than the first wireless network; and
checking the availability of the second wireless network.

14. The method of claim 13, wherein determining that the wireless device should communicate with the second wireless network over the first wireless network comprises:
   accessing a preferred roaming list stored by the wireless device, wherein the preferred roaming list prioritizes a plurality of different identifiers so as to allow the wireless device to select between wireless networks based on identifiers received by the wireless device from access points for the wireless networks; and
   using the preferred roaming list, determining that the wireless device should communicate with the second wireless network rather than the first wireless network.

15. The method of claim 12, wherein performing the predetermined action comprises:
   based on the identifiers, determining that the wireless device should communicate with the second wireless network rather than the first wireless network;
   using the second identifier, determining that the second wireless network uses the second air interface protocol;
   powering-up a radio in the wireless device for communicating via the second air interface protocol; and
   using the radio, checking an availability of the second wireless network.

16. The method of claim 15, wherein determining that the wireless device should communicate with the second wireless network rather than the first wireless network comprises:
   accessing a preferred roaming list stored by the wireless device, wherein the preferred roaming list prioritizes a plurality of different identifiers so as to allow the wireless device to select between wireless networks based on identifiers received by the wireless device from access points for the wireless networks; and
   using the preferred roaming list, determining that the second identifier has a higher priority than the first identifier therefore that the wireless device should communicate with the second wireless network rather than the first wireless network.

17. The method of claim 16, wherein for each identifier stored in the preferred roaming list, the preferred roaming list also stores a corresponding air interface protocol, and wherein determining that the second wireless network uses the second air interface protocol comprises accessing the preferred roaming list to determine that the second air interface protocol corresponds to the second identifier.

18. The method of claim 12, wherein the first air interface protocol is CDMA, TDMA, AMPS or GSM, and wherein the second air interface protocol is an IEEE 802.xx air interface protocol.

19. The method of claim 12, wherein the first air interface protocol is a wireless wide area network ("WWAN") air interface protocol, and wherein the second air interface protocol is a wireless local area network ("WLAN") air interface protocol.

20. A method for triggering a wireless device to perform a predetermined action, the method comprising:
   receiving a first identifier from an access point for a wireless wide area network ("WWAN"), wherein the first identifier corresponds to the WWAN, wherein the first identifier is received via a first air interface protocol, and wherein the WWAN uses the first air interface protocol;
   receiving a second identifier from an access point for a wireless local area network ("WLAN"), wherein the second identifier corresponds to the WLAN, wherein the second identifier is received via the first air interface protocol, and wherein WLAN uses a second air interface protocol; and
   based on the identifiers, performing a predetermined action.

21. The method of claim 20, wherein performing the predetermined action comprises:
   based on the identifiers, determining that the wireless device should communicate with the WLAN rather than the WWAN;
   using the second identifier, determining that the WLAN uses the second air interface protocol;
   powering-up a radio in the wireless device used to communicate via the second air interface protocol with the WLAN; and
   using the radio, checking an availability of the WLAN.

22. The method of claim 21, wherein determining that the wireless device should communicate with the WLAN rather than the WWAN comprises:
   accessing a preferred roaming list, wherein the preferred roaming list prioritizes a plurality of identifiers for respective WWANs and WLANs; and
   determining that the second identifier has a higher priority in the preferred roaming list than the first identifier and therefore than the wireless device should communicate with the WLAN rather than the WWAN.

23. The method of claim 22, wherein determining that the WLAN uses the second air interface protocol comprises:
   accessing the preferred roaming list, wherein for each identifier stored in the preferred roaming list, the preferred roaming list stored a corresponding air interface protocol; and
   determining that the second air interface protocol corresponds to the second identifier.

24. The method of claim 21, further comprising:
   if the WLAN is available, then establishing a connection with the WLAN; and
   if the WLAN is not available, then powering-down the radio in the wireless device and waiting a predetermined amount of time before subsequently checking the availability of the WLAN.

25. The method of claim 21, wherein the WWAN is a wireless telecommunications network, and wherein the WLAN is an IEEE 802.xx wireless network.

* * * * *

UNITED STATES PATENT AND TRADEMARK OFFICE
CERTIFICATE OF CORRECTION

PATENT NO. : 7,593,365 B1 Page 1 of 1
APPLICATION NO. : 10/980711
DATED : September 22, 2009
INVENTOR(S) : Delker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1358 days.

Signed and Sealed this

Twenty-first Day of September, 2010

David J. Kappos
*Director of the United States Patent and Trademark Office*